Oct. 24, 1939.　　　　P. P-G. HALL　　　　2,177,319
MILLING MACHINE
Filed Nov. 11, 1937　　　　3 Sheets-Sheet 1

INVENTOR
Peter P-G. Hall.

Oct. 24, 1939.   P. P-G. HALL   2,177,319
MILLING MACHINE
Filed Nov. 11, 1937   3 Sheets-Sheet 2

Fig. 2.

INVENTOR
Peter P-G. Hall.

WITNESS
F. J. Hartman.

BY
ATTORNEY

Patented Oct. 24, 1939

2,177,319

UNITED STATES PATENT OFFICE 2,177,319

MILLING MACHINE

Peter P-G. Hall, Philadelphia, Pa., assignor to The Hall Planetary Company, Philadelphia, Pa., a corporation of Pennsylvania Application November 11, 1937, Serial No. 173,974

21 Claims. (Cl. 10—154)

The present invention relates to milling machines of the general type disclosed in United States Letters Patent granted to me as follows: 1,316,718, September 23, 1919; 1,507,235, September 2, 1924; 1,899,865, February 28, 1933; 2,008,757, July 23, 1935; 2,081,275, May 25, 1937; and is particularly directed to providing improved control means for such machines and to improvements in the driving mechanism thereof whereby the operation of the machine is facilitated and the ease with which adjustment, repair and/or replacement of the driving mechanism and associated parts may be made is materially enhanced.

Milling machines of the type generally exemplified in the aforementioned patents, which are commercially known as "planetary" milling machines, have been gradually improved during the considerable period which has elapsed since they were first placed on the market with resultant increase in operative efficiency, adaptability to various lines of work and greater ease of adjustment and/or repair so that as now manufactured they are capable of performing a very wide range of milling operations and are employed in many lines of industry. The mechanism of the present invention still further facilitates control of the machine during its operative cycle as it may be so adjusted that the latter is repeated substantially automatically for an indefinite number of times after the machine is once set into operation or so adjusted that after the performance of each operating cycle the machine is brought to rest until a new cycle is manually initiated while it enables the machine to be instantaneously stopped at any time and at any point during any operating cycle should such stoppage for any reason become desirable. The invention moreover includes among other things the provision, in combination with the said control mechanism, of improved driving means for the machine whereby advantages are attained which have not hitherto been realized in these millers as commercially manufactured.

The operating cycle of these machines comprises several motions successively imparted to a rotating cutter which motions essentially consist of initially moving the cutter in to depth in the work, then moving the cutter slightly in excess of 360° around a circular orbit concentric with the surface to be produced on the work by the cutting operation, then moving the cutter out of engagement with the work, and finally carrying the cutter around a similar circular orbit in the opposite direction to return it and other associated mechanism to starting position, the cutter during its orbital movements also being progressively moved axially when the machine is used for milling straight threads and radially of its orbit as well when milling tapered threads. These several movements of the cutter, save that of its rotation on its own axis, are effected through coordinated operation of a cylindrical outer or main container which carries in an eccentric longitudinal bore a cylindrical inner or secondary container in which the cutter spindle is, in turn, also eccentrically mounted. To move the rotating cutter in to depth in the work, which is held in fixed relation to the bed of the machine by a suitable chuck or fixture of which is determined by the configuration of the work piece, the secondary container, after the cutter spindle has been set in motion, is rotated in the main container for a predetermined distance so as to move the cutter in an arcuate path toward and finally into the work till the desired depth of cut therein is obtained, after which the main container is set in motion and the two containers rotate unitarily until the cutter has completed its orbital movement in one direction; movement of the main container is then arrested and the secondary container rotated relatively thereto in reverse direction so as to withdraw the cutter from the work and the main container is then revolved in reverse direction until it attains its initial position, thus completing the cycle of the machine. Preferably, moreover, the reverse movement of the secondary and main containers is performed at a greater speed than their corresponding but opposite motions during the first half or operative portion of the cycle so as to afford a quick return during the period when no work is being performed by the cutter.

These millers are susceptible of two main methods of operation, the first of which is wholly automatic and the second only partially so. In accordance with the first of these methods the machine is usually equipped with an automatic loader adapted during the return portion of the operating cycle to remove the milled work piece and insert a new one in position to be acted on by the cutter immediately upon completion of the said return so that the machine proceeds from one full cycle to the next without any appreciable loss of time. In accordance with the second method, however, the machine is brought to rest at the conclusion of each operating cycle so as to give the operator an opportunity to remove the milled work piece and insert a new blank in the holding fixture or chuck preparatory to initiating a new operating cycle. Moreover, in either method of operation it sometimes becomes imperative or desirable to stop the machine at some point during the operating cycle because of the breaking of a cutter or some other event which might result in damage to the machine and/or work if it were allowed to continue in operation, or to enable some adjustment to be made, and the control means of the present invention are therefore designed to enable the machine to be operated in accordance with either of the said methods at will and to permit the machine to be brought to rest almost instantaneously at any time during its operating cycle should such stoppage become necessary or desirable.

More specifically, therefore, it will now be understood that the said control mechanism may be so set that once an operating cycle is initiated it will be carried through to completion and a succeeding cycle then initiated and carried through entirely automatically for an indefinite number of times and where the work pieces are of such character that the finished piece can be removed from the machine and a new one inserted during the return portion of each cycle by suitable automatic means, which of course form no part of the present invention, a very high rate of production can be obtained. But such fully automatic operation cannot be satisfactorily employed for many classes of work and the present control mechanism may therefore be so adjusted to afford a manual or semi-automatic control of the machine whereby each operating cycle may be initiated by manipulation of a hand lever and the machine upon the completion of the cycle automatically stopped in a position to begin the next one, thus enabling the finished work to be removed and a new work piece to be inserted by hand after the completion of each cycle and prior to the commencement of the next one.

It is consequently a principal object of the invention to provide means in combination with a milling machine of the character set forth operative, when desired, to automatically reverse the motion of certain parts of the machine upon completion of their normal movements in either direction to thereby restore said parts to initial position preparatory to subsequent motion in the first direction.

Another object is the provision of such means comprising control mechanism which may be adjusted to automatically initiate a new operating cycle upon completion of the return movement of the preceding one so that the principal motions included in each cycle, which are substantially in opposite directions, as well as the successive cycles, automatically and substantially immediately succeed each other and thus permit rapid automatic feeding of work pieces to the machine to enable it to operate successively upon a large number thereof without attention from the operator and in a minimum of time.

A further object is to provide in a milling machine control and driving means therefor comprising power transmission mechanism having forward and reverse driving action at different speeds, a clutch, and control means operable in predetermined timed relation to the operating cycle of the machine to shift the clutch in opposite directions to thereby successively drive the machine in its cutting and return movements at different speeds suitably coordinated with other factors incident to its operation.

A still further object is to provide driving means for a milling machine in which the driving elements rotate on axes parallel to each other whereby the development of material end thrusts on the bearings and other parts supporting such elements is avoided, and in which spur gearing alone, as distinguished from worm, spiral and other special gearing, is employed.

Another object is the provision of milling machine drive and control mechanism adapted to be assembled in the machine as a substantially independent unit which may be removed or replaced without requiring material disassembly of the other parts of the machine.

Still another object is to provide means coordinated with the control mechanism to which reference has been made whereby a supply of coolant is delivered to the cutter and work during the cutting period of the operating cycle and is automatically shut off at the initiation of the return or idle period therein when the machine is set to stop at the end of each cycle, as when the work pieces are being manually removed and inserted and the machine manually started after the completion of each cycle.

Other objects, purposes and advantages of the invention will hereafter more fully appear or will be understood from the following description of a milling machine comprising mechanism constructed in accordance therewith as shown in the accompanying drawings, in which

Fig. 3 is an enlarged detail in vertical section taken transversely of the machine, showing the drive control unit with its several parts in the positions they occupy during the operative or cutting portion of the operating cycle of the machine.

Fig. 4 is a similar view showing the positions of these parts during the return portion of the cycle.

Fig. 5 correspondingly shows their positions when the control is at neutral and therefore inoperative to actuate the machine, as after completion of the return movement and when the machine is set for manual starting of a succeeding operating cycle.

Throughout the drawings the same characters of reference are used to designate corresponding parts.

To enable those skilled in the art to comprehend and practise the invention I shall first briefly describe in general terms a machine of the character of those disclosed in my said prior patents and the principal parts, as well as functions, of my novel driving and controlling means when operatively assembled with such machine, and will thereafter describe said means in greater detail with reference to the drawings.

As has been stated these milling machines comprise inter alia a main container, a secondary container and a cutter spindle, the last two supported within and respectively rotatable with respect to the main container, which is mounted in a suitable housing for rotation about its longitudinal axis, and under certain circumstances for limited longitudinal movement during its rotation, both containers and the spindle being carried on accurately machined or lapped bearing surfaces which substantially eliminate any "play" or lost motion but enable them to be moved with the requisite accuracy in the proper manner and with a minimum of frictional resistance. Consequently, but little more power than that required for driving the rotating cutter during its actual work upon the work piece is needed to rotate the containers in the forward direction, while in the reverse direction, when no cutting is being done, substantially only this small increment alone is sufficient. The drive for the containers, in both the forward and reverse direction, may therefore be taken off the cutter spindle driving motor or other prime mover without imposing an excessive load upon it.

It is customary to employ a chain or link-belt drive for the cutter spindle, and in the machine now to be described a driven sprocket is carried by the rear end of the spindle and connected by a link-belt to a second sprocket on a countershaft driven, through suitable sprockets and another link-belt, directly from a motor in the base of the machine; the motor shaft and the countershaft thus rotate on axes parallel with those of the spindle and main container, although in different planes.

In accordance with the present invention the countershaft to which reference has been made is carried in a transmission housing of novel design removably hung from the bed of the machine on longitudinal ways or tracks and enclosing substantially all the container driving mechanism, a driving pinion projecting slightly above the housing to mesh with a ring gear which surrounds the main container constituting the final drive for the containers.

A clutch within the housing controls the operation of this driving pinion and has three positions, namely forward, neutral and reverse, and the power transmission through the mechanism in the housing is preferably so arranged as to drive the pinion through this clutch at different speeds during the forward and reverse operation, the latter being at the higher speed so as to afford a 'quick return'. All the shafts on which the several transmission elements rotate are arranged parallel to the axes of the containers, spindle and motor, whereby material end thrust on any of the driving elements is eliminated; it is therefore unnecessary to secure the transmission housing with respect to the ways in the machine with sufficient rigidity to resist thrusts tending to move it from its proper position, and the housing, with its contained mechanism, may therefore readily be withdrawn from the machine merely by loosening a single set screw and sliding it outwardly on its ways without material disturbance of any other parts.

The clutch in the transmission housing is of the positive type comprising a slidable member or hub having teeth on both its end faces engageable with either of two discs respectively adjacent its ends having teeth on their inner faces. The hub is rigidly mounted on a clutch shaft, one end of which is splined to mesh with the container driving pinion in such way that the shaft may slide longitudinally without interfering with its effectiveness to drive the pinion, and the clutch discs which are oppositely disposed with respect to the hub, but not secured to the latter, are driven in opposite directions from the countershaft and drive the clutch shaft in respectively corresponding directions when interlocked with the hub. One of the clutch discs, namely that through which the forward drive is transmitted when the hub is interlocked therewith, is driven by a gear train and the other is driven through a combined gear and link belt train preferably arranged to give higher speed operation in the reverse direction.

The clutch shaft carrying the hub, which as noted is splined at its forward end to mesh with the container driving pinion, has at its rear or left hand end (Fig. 1) a series of spaced concentric grooves for the reception of a yoke block in which complementary grooves are formed, and these parts are fitted together so that the shaft may be slid longitudinally at any time by movement of the yoke block to engage the clutch hub with either clutch disc so as to drive the pinion, and in turn the containers, in one direction or the other, while if the hub is moved to a point midway between the clutch discs, i. e., to neutral position where it is out of engagement with either, no motion is imparted to the pinion. The control mechanism comprehended by the invention operates to slide this yoke block and clutch shaft and hence shift the clutch in timed relation to the operation of the machine and/or in response to the movements of the manual control lever in accordance with changing conditions during its operation.

The yoke block is mounted at the lower end of a generally vertically extending lever the upper end of which projects into an angular slot in the under side of a shifting block slidable transversely of the machine, so that as the shifting block is moved to and fro the lever is oscillated about its pivot to move the clutch shaft axially longitudinally of the machine.

The mechanism for moving the shifting block comprises a substantially self-contained unit mounted on the transmission housing adjacent its outer end and includes an upstanding dog which projects into the path of a lug carried by the rear end of the main container and spring and detent mechanism interposed between the dog and block in such manner that the latter is held stationary until the spring is loaded by movement of the dog, induced by that of the lug during the rotation of the container, nearly to the limit of its travel in either direction and then released for movement almost instantaneously under the influence of the loaded spring to the full extent permitted by the setting of other parts of the mechanism.

Thus when the control is set to effect automatic operation of the machine, the spring carries the block through substantially its maximum travel at each movement, so as to shift the clutch all the way from forward to reverse position or vice versa upon the completion of the container rotation in each direction. During semi-automatic operation, however, while the clutch is shifted from forward to reverse in the same way, it is shifted only from reverse to neutral position at the completion of the return movement of the containers; nevertheless the spring is fully loaded before the mechanism shifts the clutch to neutral under these conditions and is held under partial load after this shift is made so that by means, such as a hand lever, controlled by the operator it may thereafter readily be released whenever desired to shift the clutch to forward position and thereby initiate another operating cycle.

With this brief and rather general reference to the construction and operation of a milling machine embodying the present invention, I shall now describe more specifically the particular machine shown in the drawings and then explain its operation in detail to thereby enable those skilled in the art to readily comprehend the invention, it being understood, however, that the said machine is to be considered merely as illustrative of one form of the invention which has been satisfactorily operative in practice.

Figures 1, 6:
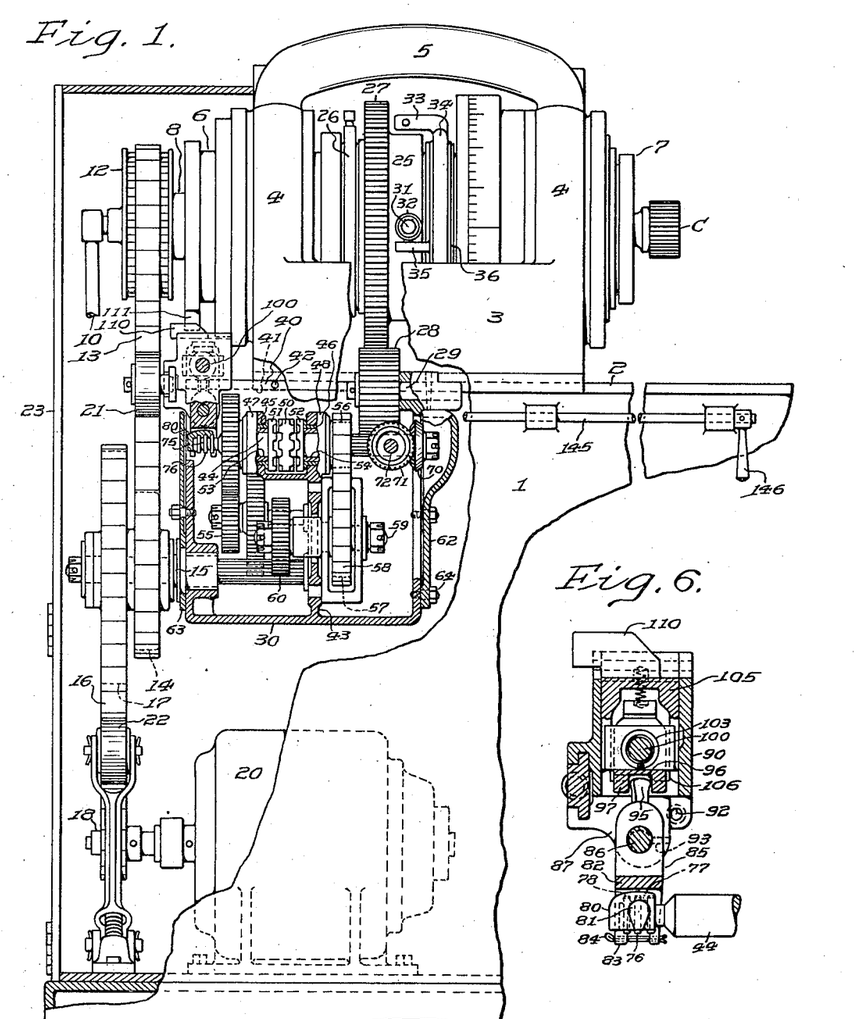
Fig. 1 is a fragmentary front elevation of the complete machine, partly in vertical section.
Fig. 6 is a transverse section of the drive control unit substantially on the line 6—6 in Fig. 5, and Figs. 7 and 8 are detail views showing the coolant control cam in different positions.
Figure 2:
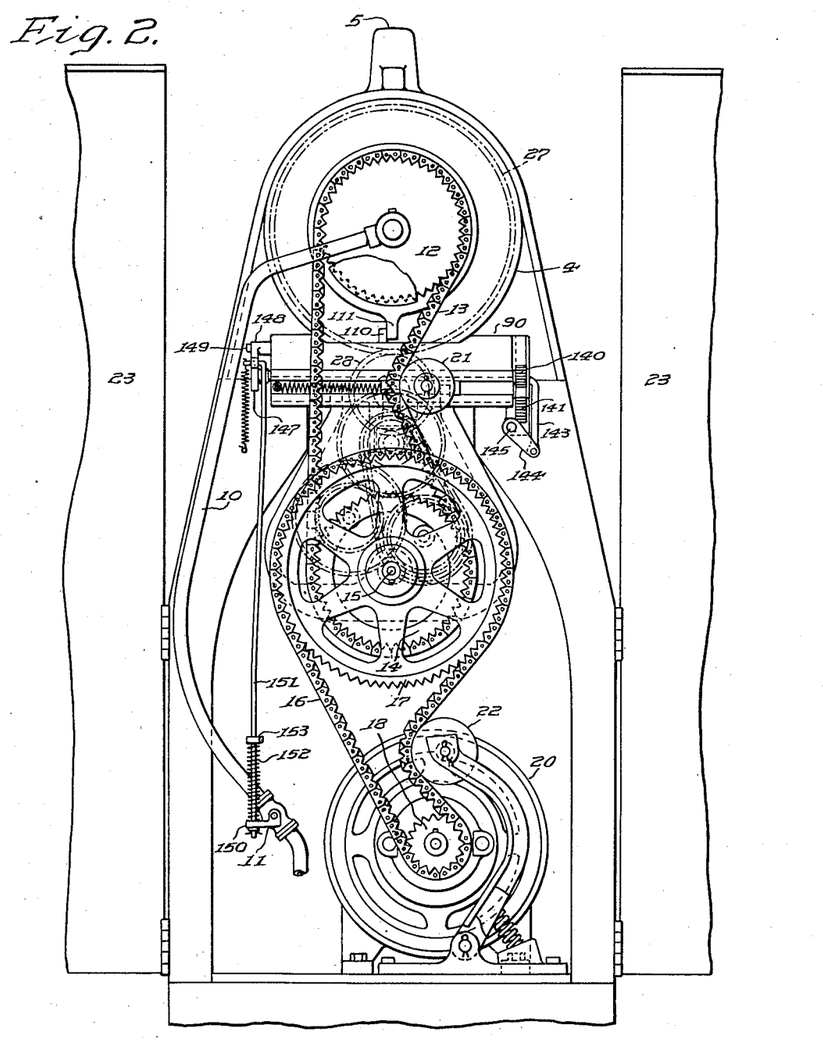
Fig. 2 is an end view looking toward the left hand end of the machine when viewed as in Fig. 1.

Referring first to Figs. 1 and 2, the machine comprises in general a bed 1 on the upper face of which are longitudinal ways 2 supporting a unitary frame 3 consisting of a pair of cylindrical horizontally aligned, longitudinally spaced housings 4 tied together by a yoke 5. Extending through the housings is the hollow cylindrical main container 6 rotatably supported on suitable bearings in the housings preferably so constructed as to enable accurate initial adjustment and subsequent compensation for any wear which may take place, as it is necessary for the production of accurate work that all play or lost motion shall be eliminated as far as possible from these bearings. Eccentrically mounted within the main container and extending from one end to the other thereof for limited rotative movement therein is a hollow secondary container 7 which, in turn, surrounds the longitudinally extending cutter spindle 8 journaled for axial rotation eccentrically of the secondary container and preferably on adjustable bearings which permit the taking up of any wear or lost motion between it and the container. The spindle is desirably made hollow for the passage of the coolant which, when the machine is in operation, is pumped thereinto through a supply pipe 10 by suitable mechanism (not shown) and controlled by a valve 11, the operation of which will hereinafter more fully appear, the coolant being discharged from the opposite end of the spindle over the cutter C and the work which is rigidly held in a suitable chuck or fixture (not shown) customarily mounted on the bed. The spindle is driven from a sprocket 12, mounted on its rear end projecting beyond the secondary container, by a link belt 13 running over a sprocket 14 on a countershaft 15 and the latter is in turn driven by a link belt 16 and sprockets 17, 18, from a motor 20 disposed in the base of the machine. Belt tighteners 21—22 comprising spring pressed rotatable rollers continuously maintain the proper tension on the belts to prevent their being thrown off their sprockets, and the belts, sprockets and adjacent parts are preferably enclosed by doors 23 suitably hinged to the base to swing oppositely outwardly as indicated when access to the said parts is desired.

Between the housings 4 the main container is surrounded by a rotatable sleeve 25 restrained from longitudinal movement relatively to the container by a suitable collar 26 on the latter and preferably mounted on ball bearings (not shown). This sleeve carries a ring gear 27 which meshes with a driving pinion 28 on a stub shaft 29 supported from the transmission housing 30, the face of the pinion extending axially for a greater distance than the ring gear so as to permit the latter to fully mesh with the former during its limited axial movement when the machine is used for milling threads. For a similar reason the spindle drive sprocket 12 is made wider than the belt which passes over it.

A stud 31 which is threaded into the secondary container projects through a slot (not shown) in the main container and a hole in sleeve 25 so that as the ring gear is turned by the pinion in one direction or the other to rotate the sleeve, the stud and secondary container are constrained to move with it but as long as the stud can move freely in the slot in the main container the latter is unaffected and remains stationary. At its outer extremity the stud 31 is provided with a head 32 conveniently in the form of a roll or block adapted to engage a stop 33 carried on a band 34 surrounding the main container and rotatively adjustable thereon, means (not shown) being provided for clamping the band in any desired position with respect to the container so that the stop, band and container will form an operatively rigid unit.

Thus when the pinion is rotated so as to turn the ring gear in a clockwise direction when the machine is viewed from its right hand end as shown in Fig. 1, an initial rotative movement is imparted by sleeve 25 and drive stud 31 to the secondary container, this movement being operative through the eccentric mounting of the secondary container in the main container to cause the cutter on the front end of spindle 8 to be moved arcuately toward the workpiece until the head on the drive stud engages stop 33. The length of this arc is of course determined by the position of rotative adjustment of the stop on the main container and is so gauged that the head will contact the stop just as the cutter attains full operative depth in the work. Thereafter through the medium of drive stud 31 the main and secondary containers move unitarily so as to carry the cutter about the work in a circular orbit concentric with the axis of the main container with the result that the cutter removes from the periphery of the work an amount of metal determined by the depth of cut to which it was initially brought by the partial revolution of the secondary container in the main container before the latter started to revolve.

At the completion of this movement, that is, when the cutter has been moved about its orbit through slightly more than 360°, the direction of rotation of the driving pinion is reversed by means hereafter to be described, thereby correspondingly reversing the direction of rotation of the ring gear and sleeve so as to move the head of the driving stud away from the stop and toward a return stop 35 carried by another band 36 also adjustably secured to the main container and so adjusted with relation to the slot in the latter that the head will contact the return stop just prior to the stud reaching the adjacent end of the slot. During the initial reverse movement of the stud between the two stops the main container of course remains stationary and the secondary container therefore turns eccentrically within it; the cutter is thus withdrawn from depth and cleared from the work by an operation which is the reverse of that by which it was brought to depth at the initiation of the operating cycle. As soon as contact between the head of the driving stud and the return stop is established the main and secondary containers move unitarily in reverse direction until all the parts have been returned to the position they occupied at the initiation of the cycle and, as has been mentioned, the speed of this movement is desirably made greater than that of the forward movement.

The several elements and instrumentalities, other than the transmission housing, to which reference has just been made are customarily found in milling machines of the type to which my invention relates and hence require no further description as their general construction and operation are well known to those familiar with these machines which are also frequently equipped with means for imparting to the cutter a progressive longitudinal or axial movement when cutting threads and, additionally, with other means for gradually moving the cutter in a generally radial direction with respect to the work which are also brought into play when tapered threads are being cut, but as the function and operation of these additional means, if utilized, are unaffected by the present invention, detailed reference thereto would be superfluous.

CONTAINER DRIVING MECHANISM

The transmission housing 30 is provided adjacent its upper edges with outwardly extending longitudinal flanges 40 engageable in suitable ways 41 arranged under the bed of the machine and it can thus be very easily slid out of its assembled position beneath the housing after removal of the driving belts 13, 16 and as easily returned thereto, thereby facilitating adjustment or repair of the mechanism contained within it since, together with the said mechanism, it forms a single self-contained unit. Moreover, as hereinafter more fully explained, as there are no appreciable end thrusts on the housing or any of its contained parts when the machine is in operation, it is unnecessary to provide any means for rigidly holding it in place, but in order to insure its being returned exactly to proper position after removal, a single set screw 42 is extended through one of the ways to engage in a corresponding hole in the housing when the latter is in correct relation to the rest of the machine.

This housing is provided with a transverse integral partition 43 which supports among other things clutch shaft 44 slidable longitudinally of the housing in bearings 45, 46 fitted at spaced points in integral bosses 47, 48 formed in the partition. This shaft is splined at its forward end to mesh with pinion 28, the splines being of sufficient length to permit full meshing at any longitudinal adjustment of the shaft, and a clutch hub 50 having its ends provided with suitable teeth as shown in Fig. 1 is rigidly secured to the shaft between its supporting bearings. Complementary toothed clutch discs 51, 52 on opposite sides of the hub are carried by sleeves 53, 54 respectively surrounding shaft 44 and extending through bearings 45, 46 between the latter and the shaft, and are sufficiently widely spaced to clear the hub when the latter is positioned midway between them. These discs are driven in opposite directions from countershaft 15, disc 51 which corresponds to the forward speed of the machine being driven through a gear train generally designated as 55 arranged in the housing and preferably so constructed as to facilitate the substitution of gears of different sizes to correspond to different required speeds, while the other or reverse disc 52 is driven through sprockets 56, 57 and a link belt 58 from a shaft 59 also geared to countershaft 15. The gear 60, driving shaft 59, as well as sprockets 56, 57 are, like gear train 55, also preferably constructed and arranged to facilitate substitution of similar elements of different sizes to effect speed changes.

The opposite ends of housing 30 are closed by cover plates 62, 63 removably secured to the housing by threaded studs and nuts 64, and an oil pump (not shown) is preferably disposed within the housing and suitably driven from countershaft 15 for flooding the clutch as well as all other transmission elements with lubricating oil during their operation.

As it is sometimes desirable when setting or adjusting the machine to actuate the transmission manually instead of by motor 20, a small bevel gear 70 is fitted on the extremity of the splined end of the clutch shaft and a corresponding bevel pinion 71 arranged on a short transversely extending shaft 72 journaled in and carried through the wall of the transmission housing so that its outer end can be engaged by a removable hand crank insertable through an opening in the side of the machine bed. The pinion shaft is slidable axially and normally maintained in a retracted position by a suitably arranged spring (not shown) so as to hold the pinion and gear apart but in such manner that by pushing inwardly on the crank when engaged with the pinion shaft the pinion may be meshed with the gear to enable the clutch shaft to be slowly turned by rotation of the crank.

CLUTCH SHIFTING MECHANISM

The rear end of clutch shaft 44 is provided with a plurality of parallel concentric grooves 75 and intervening ribs 76 which are engaged by complementary ribs 77 and grooves 78 in a yoke block 80, which rides on the clutch shaft and has projecting from its opposite sides a pair of aligned horizontal bosses 81 loosely engaged by a yoke 82 the lower ends of the arms 83 of which are fitted with cotter pins 84 to retain the yoke block in the yoke when these parts are removed from the clutch shaft. The yoke forms the lower end of a clutch shifting lever 85 mounted on a pivot pin 86 which is supported, preferably eccentrically to permit minor adjustments of the arm, in downwardly depending lugs 87 of a transversely extending housing 90 containing certain parts of the clutch shifting mechanism. This housing is provided with ways 91 on its bottom adapted to receive the rearmost parts of the flanges on the transmission housing so that the housing 90 is supported on the latter and can be readily removed when desired by sliding it rearwardly from its assembled position, set screws (not shown) extending through holes 92 in its ways to engage the transmission housing serving to hold it in place. Likewise pivot pin 86 is held in fixed adjusted relation to the lugs on the housing by a set screw 93.

The upper end of lever 85 lies within the housing and carries an integral upwardly projecting dog 95 which extends angularly with respect to the pivotal axis of the arm in parallelism with the sides of an angular slot 96 in the bottom of a movable shifting block 97 into which the dog projects, the angularity of the slot being such that as the block is moved longitudinally of the housing, i. e., transversely of the machine, the dog through its engagement in the slot is moved substantially at right angles to the movement of the block to swing the lever about its pivot and thereby slide the clutch shaft 44 longitudinally in its bearings. Thus the pivotal adjustment of the clutch lever, which is determined by the position of the block longitudinally of its housing, in turn determines the position of the hub 50 of the clutch with respect to the complementary discs on opposite sides thereof, and these several parts are accordingly so constructed that when the block is at one extremity of its travel the hub engages rear disc 51 corresponding to the forward drive of pinion 28; when the block is at its other extremity of travel the hub engages front disc 52 to drive the pinion in the opposite direction, and in its intermediate position the block holds the hub midway between the outer discs 51, 52 and out of engagement with both of them so that no drive is transmitted to pinion 28, i. e., the transmission is in "neutral".

The mechanism for sliding the shifting block 97 to these several positions to thereby control the drive of the machine acts upon the block through its upturned integral ends 98, 99 through which extends a rotatable shaft 100 journaled in the ends of the housing. Interposed between these block ends and slidable on the shaft are bearing plates 101, 102 which extend laterally outward beyond the side edges of the block ends and are yieldingly held apart and in engagement with the inner faces of the latter by a coil spring 103 surrounding the shaft. A slide 105 is also disposed in the housing and has at its opposite ends pairs of downwardly depending legs 106, 107 respectively adapted to engage the outwardly projecting ends of bearing plates 101, 102 but to clear the adjacent upturned ends of the block. Thus when the slide moves in one direction or the other its legs at one end engage the corresponding bearing plate 101 or 102 to slide it along shaft 100 while the legs at the other end may move away from their adjacent bearing plate, as when the block 97 and hence its upturned ends are prevented from moving with the slide; under such circumstances spring 103 is compressed or "loaded" to store up energy for subsequently moving the block when it is thereafter released.

Slide 105 has on its upper surface an upwardly projecting dog 110 which extends into the path of a lug 111 secured to the rear end of the main container so that when during rotation of the latter the lug is brought into engagement with the dog, it tends to move the slide longitudinally in the housing 90 in a direction corresponding to the direction of rotation of the container.

Consequently as the container turns, for example counterclockwise when viewed as in Fig. 2, with lug 111 in engagement with dog 110, the slide is moved to the right in Fig. 2 and when the container turns in the opposite direction, bringing the lug into engagement with the other side of the dog, the slide is also moved in the opposite direction, that is, to the left in said figure, in each case the movement of the slide causing corresponding movement through legs 106, 107 of one of the bearing plates 101 or 102.

Certain mechanism, now to be described, is interposed between slide 105 and shifting block 97 to control the action of the block to shift the clutch through clutch lever 85 in properly timed sequence to cause the machine to carry out its successive cutting cycles and also to permit it to be subjected to manual control at any time when desired.

This mechanism includes a pair of elongated spring pressed detents 115, 116 supported on horizontal pivot pins 117, 118 extending transversely of housing 90 beneath the upper part of the slide; these detents have notches 119, 120 adjacent their outer ends respectively adapted to engage the upper edges of the upturned ends 98, 99 of the shifting block when they are in position for such engagement, and the inner extremities of the detents are formed on their upper sides with inclined surfaces 121, 122 adapted for engagement by detent depressing ribs 123, 124 extending across the under side of the slide and equally spaced in opposite directions from the dog on its upper side.

The detents have at their outer extremities downwardly depending ribs 125, 126 respectively adapted for engagement by eccentric cam surfaces 127, 128 on cams 129, 130 carried on shaft 100 adjacent the ends of the housing, the cams being suitably fixed to the shaft for rotation therewith. These cams are also provided with concentric cam surfaces 131, 132 adapted for engagement with similar but oppositely angular cam surfaces 133, 134 on the ends of shifting block 97 and springs 135 are interposed between the cams and the ends of the housing to take up any longitudinal looseness of the shaft and the cams and to absorb part of the shock when the shifting block is snapped against the latter.

Exteriorly of the housing 90 one end of shaft 100 has secured to it a pinion 140 meshing with a rack 141 vertically slidable in ways 142 formed in the end of the housing. This rack is arranged for manual actuation through the medium of a link 143 connecting the rack with a crank arm 144 carried by a shaft 145 extending longitudinally along the front of the machine and provided with a suitable hand lever 146 positioned conveniently to the operator by means of which the shaft may be rotated when desired.

The other end of shaft 100 preferably carries a notched cam 147 adapted to engage and actuate a lever arm 148 positioned near it and supported on a pivot 149 from the adjacent end of the housing 90, and the outer extremity of this lever is connected to the control arm 150 of oil valve 11 through the medium of a pull rod 151, a spring 152 and collar 153 forming a yieldable lost motion connection between the rod and the valve lever in one direction.

OPERATION (a) *Fully automatic operation*

I shall now refer more particularly to the operation of a machine constructed substantially as hereinbefore described, and shall first consider the setting and condition of the control and driving mechanism during fully automatic operation, that is, it will be assumed the machine is equipped with an automatic loader for removing a finished work piece and substituting a new blank therefor during the return portion of each cycle so that upon completion of the return a new cycle can be immediately initiated. The control mechanism is therefore set to automatically bring about reversal of the machine drive at the completion of each return movement as well as at the completion of each forward or cutting movement, to which end rack 141 through operation of hand lever 146 is raised to and held at a point slightly above its lowermost position, the hand lever being provided with a spring pressed ball or the like (not shown) to releasably keep it so raised when desired, to thereby hold shaft 100 at a rotative position such that the concentric cam surfaces 127, 128 do not engage ribs 125, 126 of the detents and do not interfere with their normal travel, while the "high" points of concentric cam surfaces 131, 132 of cams 129, 130 are out of alignment with the corresponding high points of cam surfaces 133, 134 on the ends of shifting block 97 so that the possible longitudinal travel of the latter is at its maximum.

Figures 3, 4, 5, 7, 8:
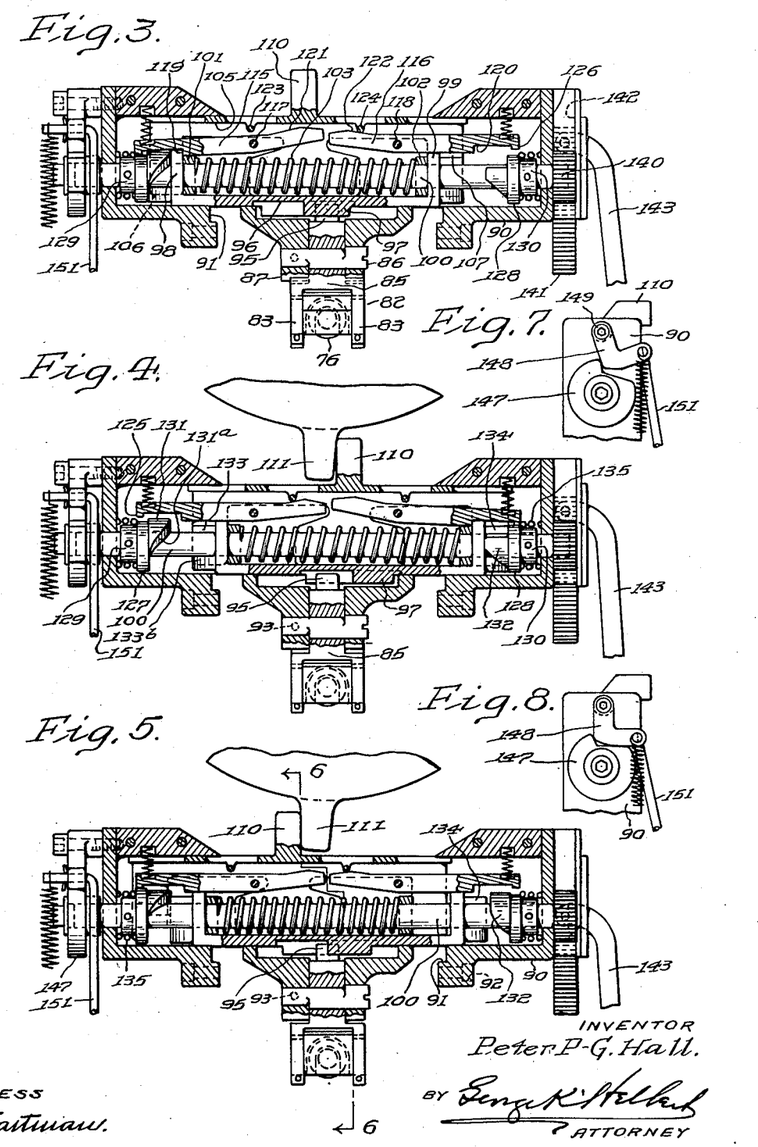

In full and semi-automatic operation the parts of the clutch shifting and control mechanism during the forward or cutting movement occupy the respective positions shown in Fig. 3, that is, the left hand detent 115 is depressed by its spring so that its notch 119 engages the adjacent upturned end 98 of shifting block 97 which is at the left hand extremity of its travel; the slide dog 110 is slightly to the left of the center of the housing, and legs 106, 107 at opposite ends of the slide respectively engage bearing plates 101, 102 which are held against the adjacent upturned ends 98, 99 of block 97 by spring 103; right hand detent 116 merely rests on the upper edge of the adjacent upturned end 99 of shifting block 97 and slot 96 in this block holds dog 95 on clutch lever 85 at its maximum extent of travel to the right in Fig. 1. Clutch shaft 44 therefore occupies its position of maximum retraction to the left in said figure and maintains hub 50 of the clutch in mesh with the forward drive disc 51. Pinion 28 is thus driven in a clockwise direction, thereby driving the containers in a counter-clockwise direction when viewed from the rear of the machine as in Fig. 2 to carry out the forward or cutting portion of the cycle.

While this movement is taking place lug 111 is carried around with the main container and is so positioned thereon that it contacts dog 110 just prior to completion of the cutting operation and slide 105 is thus moved toward the right in Figs. 3 and 4 so that the downwardly depending legs 106 on the left hand end of the slide move bearing plate 101 along shaft 100 in a corresponding direction as the end of the cutting portion of the cycle is approached. Shifting block 97 is initially prevented from like movement, however, by the engagement of notch 119 of detent 115 against the left hand block end 98 and the movement of slide 105 therefore initially places spring 103 under greater than normal compression. However, when the slide is moved far enough to the right for depressing rib 123 to engage inclined surface 121 of detent 115 and cause it to move about its pivot 117, thus raising its opposite end, its notch 119 is disengaged from the adjacent end of the shifting block just as or preferably slightly after the cutter completes its cut, thereby permitting spring 103, placed under compression in the manner described, instantly to snap block 97 toward the opposite end of the housing and into the position shown in Fig. 4, thereby simultaneously moving clutch lever 85 through coaction of slot 96 with dog 95 so as to shift the clutch shaft axially in the transmission housing, first to disengage clutch hub 50 from the forward driving disc 51 and then to move it into mesh with reverse disc 52 to reverse the direction of movement of drive pinion 28 and initiate the return movement of the containers, cutter and associated parts.

As will be apparent from Fig. 4, as the shifting block 97 reaches its extreme right hand position, notch 120 on detent 116 engages back of the adjacent turned-up end 99 of the block and as the lug thereafter moves away from dog 110 during the return or reverse rotation of the container, the slide 105 comes to rest at the position shown in Fig. 4 with dog 110 slightly to the right of the center line of the housing. Consequently when just prior to completion of the return movement lug 111 engages the opposite side of dog 110 and moves the slide toward the left, substantially similar but reverse action of the several parts takes place to shift the clutch to forward position by returning the parts of the clutch shifting mechanism to the position shown in Fig. 3. These sequential operations are thus carried out an indefinite number of times entirely automatically as long as shaft 100 is kept at the rotative position shown in Figs. 3 and 4, that is, as long as rack 141 is maintained, by a suitable fixed adjustment of the hand actuating lever, substantially at the position indicated in said figures, with the result that after each blank is positioned in the machine the cutting portion of the cycle is initiated and carried through to suitably mill the blank and the cutter and associated parts are then returned to initial position without any attention from the operative and without appreciable delay or loss of time between the cutting and reverse movements or between succeeding cycles.

(b) *Semi-automatic operation*

When the machine is to be used in such way as to complete a single operative cycle and then come to rest in position for initiating another cycle when desired, hand lever 146 is released from the partially raised position at which it is held during automatic operation so it can act through shaft 145, crank arm 144 and link 143 to bring rack 141 to its lowermost position, where it is preferably held by gravity. The rotative position of shaft 100 corresponding to this position of the rack as shown in Fig. 5 is such that the high point of the left hand concentric cam surface 131 is in alignment with the high point of adjacent cam surface 133 on shifting block 97, and the latter is consequently prevented from moving to the left hand extreme limit of its travel when through rotation of the main container in clockwise direction during its return movement lug 111 contacts dog 110 to move the slide toward the left. Consequently upon release of shifting block 97 from detent 116 due to the depression of the latter by rib 124 on the slide, the shifting block can move only from the position shown in Fig. 4 to that shown in Fig. 5 which is substantially midway between the positions shown in Figs. 3 and 4, so that clutch lever 85 is moved only to substantially vertical position, thus disengaging clutch hub 50 from the reverse driving disc 52 but not meshing it with the forward driving disc 51. The containers therefore come to rest upon completion of the return movement but with lug 111 pressed against dog 110 on slide 105, so that the latter is held to the left of its normal position and, through engagement of its legs 107 with the bearing plate 102, maintains spring 103 under considerable compression.

Thereafter when it is desired to initiate a subsequent operating cycle, the actuating lever 146 is lifted so as to raise rack 141 and rotate shaft 100 sufficiently to disengage the high point of cam surface 131 on cam 129 from the high point of cam surface 133 on the end of the shifting block. The latter, due to the compression under which spring 103 has been maintained by the slide, then immediately snaps to the position shown in Fig. 3, shifting clutch lever 85 to bring clutch hub 50 into mesh with forward drive disc 51 and initiate a new cutting cycle.

After actuating lever 146 has been raised to permit block 97 to snap to forward position, it may be released and allowed to fall by gravity but due to the presence of cam surface 133 the shaft is prevented from returning to its former position. However, after completion of the forward cutting movement, that is, when the slide block has been moved to the right for returning the containers as shown in Fig. 4, shaft 100 is freed of this interference and thus can rotate to bring the high point of cam surface 131 again into registry with the corresponding point on cam surface 133 of the shifting block whereby movement of the block to the forward position is prevented upon completion of the ensuing return movement. Consequently upon completion of that movement the clutch is only returned to neutral position, but spring 103 retains its abnormal compression after rotation of the containers has stopped and it is therefore sufficiently "loaded" to permit the clutch to be again shifted automatically to forward position as soon as the actuating lever is raised to initiate the next cutting cycle.

(c) Emergency throw-out

As has been explained in connection with semi-automatic operation, cam surfaces 131 and 133 at the left hand end of the clutch control mechanism are so formed that when their high points are in alignment the shifting block cannot move to the left beyond the point corresponding to the neutral position of the clutch. These cam surfaces are also provided with angular end faces 131a, 133b which are so arranged as to permit a longitudinal camming action tending to force the block toward neutral position when the shaft is rotated in a counterclockwise direction as viewed in Fig. 2 with such faces in engagement. Moreover the high point of the eccentric cam 127 on cam 129 is so arranged rotatively with respect to cam surface 131 that it engages rib 125 at the extremity of detent 115 just prior to the angular portions of the first cam surfaces coming together during rotation of the shaft, thus raising this detent against the force of its spring so as to disengage its notch 119 from the turned-up end of the shifting block and holding it in this position during further rotation of the shaft. Consequently when the shifting mechanism is in the position shown in Fig. 3 rotation of shaft 100 through about 180° in a counterclockwise direction, effected by raising the rack by means of actuating lever 146, first disengages detent 115 from the adjacent end of the shifting block and then positively shifts the latter longitudinally by the action of cam surfaces 131, 133 to bring the shifting block to substantially central or neutral position.

Similarly cams 128, 132 are formed and arranged for cooperation respectively with rib 126 on detent 116 and cam surface 134 on the opposite end of the shifting block to release the latter and shift it to neutral position from the position shown in Fig. 4 when shaft 100 is rotated in the manner described. Consequently at any time during the operating cycle and irrespective of whether the shifting block is at one extremity or the other of its travel, rotation of the shaft through about 180°, which can be readily and quickly effected merely by raising the actuating lever and hence rack 141 a sufficient distance, is operative to immediately shift the block to neutral position and disengage clutch hub 50 from whichever driving disc with which it has been in mesh with resultant almost instantaneous stoppage of the container drive whether the control is set for fully automatic or semi-automatic operation.

(d) Coolant control mechanism

Mention has been made of the automatic control of the flow of coolant during the machining operation and the different rotative positions of shaft 100 corresponding to different operating conditions of the machine have been described; it is thus evident that when the control mechanism is set for fully automatic operation the rotative position of shaft 100 remains fixed but in semi-automatic operation is moved twice during each cycle, once manually and once by gravity.

Cam 147 is positioned on this shaft and as shown in Figs. 7 and 8 so formed as to cause arm 148 to lift pull rod 151, and through valve control arm 150 open oil valve 11 and thereby establish a continuous flow of coolant through hollow spindle 8 whenever the shaft is moved from its Fig. 5 positon to that of Fig. 3 with consequent shifting of the clutch into forward drive. At the beginning of each return movement of the machine when it is set for semi-automatic operation, however, shaft 100 moves by gravity of rack 141 and actuating lever 146 through several degrees of arc in the opposite direction, that is, back to the Fig. 5 position, to bring the high point of cam surface 131 into alignment with the high point of cam surface 133, and when pump cam 147 is correspondingly brought back to its Fig. 3 position it permits valve arm 148 to move downwardly to close valve 11 and interrupt the coolant supply. Thus whenever a cutting cycle is initiated by moving shaft 100, valve arm 148 is raised thereby opening valve 11 and thereafter holding it open until the initiation of a return movement preparatory to the stoppage of the machine, as in semi-automatic operation, so that a continuous supply of coolant is delivered to the cutter and work during the cutting or forward portion of the cycle and its flow interrupted during the return or inoperative portion so that the operator can immediately begin removing the finished work piece after the return movement commences without waiting for the machine to finally stop. However, when the machine is set for full automatic operation shaft 100 and cam 147 remain in their Fig. 3 positions throughout the cycle and thus keep a full supply of coolant flowing through the spindle to the cutter at all times, since this has been found preferable to interrupting the flow during the return when the cycles are automatically repeated.

It will be apparent from the foregoing that the milling machine drive and control mechanism of my invention, one embodiment of which is herein specifically shown and described, permits wide flexibility in operating conditions, assures maximum production with substantially no time loss between successive cycles when the machine is set for full automatic operation and, when it is set for semi-automatic operation, requires no attention or manipulation by the operator to bring about the return of the parts to initial position after the cutting portion of the cycle or to stop the machine when that position is attained, thereby placing it in condition to repeat its cycle whenever desired.

Moreover it is of particular advantage from the standpoints of convenience and low upkeep expense that my driving and control mechanism is of unitary character which enables the entire assembly to be readily removed from the machine without material disassembly of other parts, while the absence of thrust bearings and worm or other special gearing decreases its initial cost and insures its satisfactory operation over a long period of time. Additionally the facility with which the gears in the transmission housing may be removed for substitution of other gears to change the driving and return speeds affords substantially complete universality of drive whereby the machine may be used in a great variety of different operations and the necessity for special design and construction to adapt it for a specific duty is usually rendered unnecessary.

Finally it will be understood that while I have herein described one embodiment of the invention with considerable particularity, I do not thereby desire or intend to limit or confine myself thereto in any way as numerous changes and modifications in the form, construction and arrangement of the several parts, their mode of assembly and cooperation and the specific purposes for which they are employed will readily occur to those skilled in the art and may be made if desired without departing from the spirit and scope of the invention as defined in the appended claims.

Having thus described my invention, I claim and desire to protect by Letters Patent of the United States:

1. In a milling machine having a cutter spindle and a rotatable container surrounding the spindle, driving means for the container having forward and reverse driving positions including a rotatable element movable parallel to the container axis, a part rotatable with the container in a plane normal to the path of said element, and means interposed between said part and said element for shifting the latter from one of said positions to the other in timed relation to the rotation of the container.

2. In a milling machine comprising a cutter spindle and a rotatable container surrounding said spindle, means for reversing the direction of movement of the container comprising means for driving the container, a clutch interconnected therewith having forward and reverse driving positions including a sliding element movable from one of said positions to the other along a path parallel to the axis of the container, and means for shifting said clutch element including a part rotatable with the container about its axis and means interposed between said part and the element operable by the former to shift the latter in timed relation with the rotation of the container.

3. In a milling machine comprising a cutter spindle and a rotatable container surrounding said spindle, means for reversing the direction of movement of the container comprising means for driving the container, a clutch interconnected therewith having forward and reverse driving positions including a sliding element movable from one of said positions to the other along a path parallel to the axis of the container, and means for shifting said clutch element including a part rotatable with the container about its axis and means interposed between said part and said element operative to convert the rotative motion of the part into rectilinear motion to shift the element from one position to the other.

4. In a milling machine having a rotatable container, container driving mechanism comprising a gear on the container, a pinion meshing therewith, a clutch element shiftable parallel to the pinion axis to forward and reverse driving positions to drive the pinion sequentially in opposite directions, means for shifting said element to and from each of said positions comprising a lever, and means driven from the container including an element carried by and rotatable with the container about its axis operable to actuate the lever in opposite directions.

5. In a milling machine having a rotatable container, driving mechanism therefor comprising a clutch having forward and reverse driving positions and a neutral position, a pivoted lever adapted to shift the clutch from one of said positions to another, an angularly slotted shifting block engaging the lever and slidable along a path parallel to the axis of the lever pivot, and means including a part carried by the container for sliding the block to move the lever on its pivot.

6. In a milling machine having a rotatable container, driving mechanism therefor comprising a clutch having forward and reverse driving positions and a neutral position, a pivoted lever adapted to shift the clutch from one of said positions to another, an angularly slotted shifting block engaging the lever and slidable along a path parallel to the axis of the lever pivot, means for sliding the block to move the lever on its pivot, and means operated by a driven element of the machine for actuating the block sliding means.

7. In a milling machine having a rotatable container and a cutter spindle journaled therein, container driving mechanism including a drive pinion rotatable on an axis substantially parallel to the axis of the spindle, a clutch shaft parallel to said axis and geared to the pinion, a clutch member on the shaft, means rotatable on axes parallel to the clutch shaft cooperable with said clutch member to drive the shaft selectively in opposite directions, and means actuated from the container for sequentially shifting the clutch shaft.

8. In a milling machine comprising a rotatable container housing a cutter spindle, means for driving the container comprising a drive pinion, a clutch including a hub rotatable on an axis parallel to the spindle and pinion axes and coaxial complementary rotatable discs respectively adapted for engagement by the hub, means for driving the discs in opposite directions, and means including a part carried by the container for shifting the hub selectively into and out of engagement with the discs.

9. In driving mechanism for a milling machine comprising a rotatable container housing a cutter spindle, a clutch shaft operative when rotated to drive the container and longitudinally slidable on an axis parallel to the axis thereof to change the direction of said drive, and means for sliding the clutch shaft including a lever interconnected with the shaft and pivoted on an axis normal to the container axis and means actuated from the container for moving said lever about its pivot.

10 A milling machine comprising a rotatable container and a bed supporting the container providing ways extending parallel to the container axis, a transmission housing slidably engaging in said ways to support the housing generally adjacent the bed, a pinion journaled in the housing for driving the container, and means including gearing within the housing for driving the pinion selectively in opposite directions.

11. A milling machine comprising a rotatable container and a bed supporting the container providing ways extending parallel to the container axis, a housing slidably engaging in said ways to support the housing generally beneath the bed, a pinion for driving the container journaled in the housing on an axis parallel to the container axis, means supported from the housing operable to rotate the pinion selectively in opposite directions, and means carried by the container adapted to actuate said last mentioned means to control the direction of rotation of the pinion in timed relation to the movement of the container.

12. A milling machine comprising a driven element, a gear carried thereby, a bed supporting said element and providing ways extending parallel to the axis thereof, a transmission housing slidable from one end of the bed along said ways to assembled position with respect to the bed, and transmission means partially contained in said housing and including a pinion meshing with said gear when the housing is in said position for driving said element.

13. In a machine of the class described having a supporting bed, a rotatable container, a gear carried thereby and a cutter spindle journaled therein, container driving mechanism comprising a pinion rotatable on an axis substantially parallel with the container axis, a clutch shaft extending parallel to the pinion axis and geared to the pinion, a clutch element on the shaft, means rotatable on axes parallel to the clutch shaft cooperable with the element to drive said shaft selectively in opposite directions, and a housing disposed generally beneath the bed providing support for said shaft and pinion and comprising flanges in its upper portion cooperative with the bed to suspend the housing therefrom in longitudinally slidable relation thereto with the pinion in operative relation to the container gear.

14. In drive control mechanism for a milling machine comprising a rotatable container and driving means therefor, a shifting block slidable along a path normal to the container axis, means actuated by the block for sequentially reversing the container drive, means actuated from the container for storing up energy for sliding the block, and releasable means for restraining the block from sliding movement.

15. In drive control mechanism for a milling machine comprising a rotatable container and driving means therefor, a shifting block slidable along a path normal to the container axis, means actuated by the block for sequentially reversing the container drive, means actuated from the container for storing up energy for sliding the block, releasable means for restraining the block from sliding movement, and means for actuating said releasable means in correspondence with the movement of the container-actuated means to release the block for movement under the influence of the energy-storing means.

16. In milling machine driving mechanism, a drive pinion, a clutch operable to control the direction of its rotation and means for shifting the clutch comprising a pivoted lever, a dog projecting therefrom, a shifting block slidable parallel to the pivotal axis of the lever having an angular slot adapted to receive the dog, means for sliding the block including a spring, a slide movable parallel to the block operable to compress the spring in opposite directions, and means driven from the pinion operable to sequentially actuate the slide in opposite directions to thereby correspondingly energize the spring to slide the block and shift the clutch.

17. In a machine of the character described, clutch shifting mechanism comprising a pivoted lever, an angularly slotted shifting block adapted to engage said lever to move it on its pivot in correspondence with the movements of the block, detents respectively operative to restrain movements of the block in opposite directions, a spring adapted to move the block, means operable to first energize the spring in one direction or the other and thereafter to actuate one of the detents to release the block for movement by the energized spring, and means for actuating said last mentioned means.

18. In milling machine clutch shifting mechanism, a housing, a shifting block slidable longitudinally thereof, a shaft rotatable in the housing and extending through the block, detents carried by the housing respectively adapted to restrain the block from movement in opposite directions, a spring adapted to move the block, a slide carried by the housing operative to energize said spring, and means carried by the slide for actuating the detents to release the block for sliding movement under the influence of the spring in correspondence with movements of the slide.

19. Milling machine drive control mechanism comprising a pivoted lever having a dog at one end, a slidable shifting block disposed adjacent the lever having a slot receiving the dog and extending angularly to the path of movement of the block, a shaft along which the block is slidable, a coil spring surrounding the shaft, bearing plates carried by the shaft interposed between the ends of the spring and the adjacent ends of the block and extending outwardly beyond the latter, detents adapted to releasably engage the ends of the block adjacent said plates to restrain the block from movement in opposite directions, means for moving either plate to compress the spring toward the other plate, and means for actuating one of the detents to release the block for movement by the spring in coordinated relation with the movement of said last mentioned means.

20. In milling machine drive control mechanism, a rotatable shaft, axially spaced cams carried by the shaft each having a concentric cam surface and an eccentric cam surface, a clutch shifting block slidable between the cams and having cam surfaces adjacent its ends respectively adapted to engage the concentric surfaces thereof, detents having notches adapted to engage the ends of the block and ribs adapted for engagement by said eccentric surfaces, and means for rotating the shaft when the block is at either extremity of its travel whereby through the action of the eccentric cam surface of one of said cams in engagement with the rib of the adjacent detent, said detent is disengaged from the block, and by engagement of the concentric surface of said cam with the adjacent cam surface on the block, the block is thereafter slid longitudinally of the shaft.

21. In control mechanism for a machine of the character described, an axially slidable clutch shaft, a pivoted lever operable to slide the shaft axially, a shifting block slidable transversely of the clutch shaft and having an angular slot adapted to receive a portion of the lever to move it about its pivot in correspondence with sliding movements of the block, the block having cam surfaces adjacent its opposite ends, a rotatable shaft extending longitudinally of the block, cams carried thereby beyond the ends of the block having cam surfaces respectively adapted to engage the cam surfaces on the blocks, and means for rotating the cam-supporting shaft when the block is at either extremity of its travel to thereby rotate the cams to slide the block.

PETER P-G. HALL.

CERTIFICATE OF CORRECTION.

Patent No. 2,177,319.   October 24, 1939.

PETER P-G. HALL.

It is hereby certified that error appears in the printed specification of the above numbered patent requiring correction as follows: Page 1, second column, line 14, after the word "fixture" insert the character; and that the said Letters Patent should be read with this correction therein that the same may conform to the record of the case in the Patent Office.

Signed and sealed this 5th day of December. A. D. 1939.

(Seal)

Henry Van Arsdale,
Acting Commissioner of Patents.